United States Patent [19]

Karim et al.

[11] 4,273,893

[45] Jun. 16, 1981

[54] TERNARY BLENDS OF LOW DENSITY ETHYLENE POLYMERS, ETHYLENE-ALKYL ACRYLATE COPOLYMERS AND AMORPHOUS ISOBUTYLENE POLYMERS

[75] Inventors: Khalid A. Karim; James H. Rea, both of Houston, Tex.

[73] Assignee: Gulf Oil Corporation, Pittsburgh, Pa.

[21] Appl. No.: 174,300

[22] Filed: Jul. 31, 1980

[51] Int. Cl.³ .................... C08L 23/06; C08L 23/08; C08L 23/20; C08L 33/08
[52] U.S. Cl. ................................... 525/227; 525/240
[58] Field of Search ................................. 525/227

[56] References Cited

U.S. PATENT DOCUMENTS

| | | | |
|---|---|---|---|
| 3,201,498 | 8/1965 | Brunson et al. | 525/227 |
| 3,932,341 | 1/1976 | Kutch et al. | 260/33.6 |
| 4,140,733 | 2/1979 | Meyer et al. | 525/227 |

*Primary Examiner*—Carman J. Seccuro
*Attorney, Agent, or Firm*—Richard L. Kelly

[57] ABSTRACT

Compatible ternary polymer blends are disclosed which consist essentially of a low density ethylene polymer, an ethylene-alkyl acrylate copolymer, and an amorphous isobutylene polymer. The compositions seal well at temperatures below those required for heat sealing ethylene polymers.

8 Claims, No Drawings

TERNARY BLENDS OF LOW DENSITY ETHYLENE POLYMERS, ETHYLENE-ALKYL ACRYLATE COPOLYMERS AND AMORPHOUS ISOBUTYLENE POLYMERS

BACKGROUND OF THE INVENTION

Low density ethylene polymers are widely employed in the manufacture of polymer films. In preparing bags, pouches, and the like from such films, the films are heat sealed together under pressure. It would be desirable to seal such films together at lower temperatures than are presently required with low density ethylene polymers.

SUMMARY OF THE INVENTION

The applicants have discovered that low density ethylene polymers can be blended with ethylene-alkyl acrylate copolymers and amorphous isobutylene polymers in specific proportions to provide compatible blends that melt at lower temperatures than the low density ethylene polymer contained therein. As a consequence, films prepared from such polymer blends can be heat sealed at significantly lower temperatures than those required to heat seal films of the low density ethylene polymer contained therein.

DETAILED DESCRIPTION OF THE INVENTION

The polymer blends of the invention consist essentially of 100 parts of combined weight of the low density ethylene polymer and the ethylene-alkyl acrylate copolymer and about 15-75, preferably about 20-67, and more especially about 30-55 parts by weight of the amorphous isobutylene polymer. The two ethylene polymers are present in a ratio such that the ethylene-alkyl acrylate copolymer constitutes about 15-50, preferably 25-35 and more especially about 30 weight % of the total weight of the two ethylene polymers. The polymer blends can be prepared by any of the common techniques employed in the art to prepare blends of two polymers. This conventionally is done by malaxating the polymers on a two-roll rubber mill, in Banbury mixers, or by extruding the mixture, or by other like techniques.

The low density ethylene polymers included in the blends will be the conventional film forming grades of ethylene polymers which have a density of less than about 0.945, preferably less than about 0.94, and more especially less than about 0.93. It is preferred to employ polymers having melt indexes in a range of about 0.5-20, preferably about 0.5-10, and more especially about 0.5-5.0. The low density ethylene polymers can be prepared by the well known high pressure processes, or by lower pressure processes by copolymerizing ethylene with $C_3$ and higher alpha-olefins.

The ethylene copolymers included in the blends have polymerized therein about 70 to 98, preferably about 78-83, and more especially about 80 weight % of ethylene, with the balance of the copolymer being an alkyl ester of acrylic or methacrylic acid. The alkyl group of the acrylic or methacrylic acid ester may contain from about 1 to 18 carbon atoms, with the preferred esters being the methyl and the ethyl esters. Such copolymers can be prepared by known methods as disclosed, for example, in U.S. Pat. No. 3,350,372, the disclosure of which is incorporated herein by reference. It is preferred practice to control both the alkyl acrylate content of the copolymer and the ratios of the two ethylene polymers so that the alkyl acrylate moiety constitutes about 4-10 and preferably about 5-7 weight % of the total weight of the two ethylene polymers.

The amorphous isobutylene polymers are known products, many of which are commercially available. In general, the products have molecular weights from about 10,000 to 150,000 or even higher. Polymers having a molecular weight of about 60,000 to 135,000 and more especially about 90,000 to 120,000 are preferred for use in the present invention. They are prepared by polymerization at very low temperatures in the presence of Friedel-Crafts catalysts. Although isobutylene homopolymers are preferred for use in the invention, it also is possible to employ isobutylene copolymers with other hydrocarbon monomers such as conjugated 1,3 dienes. Butyl rubber is an example of an isobutylene copolymer suitable for use in the invention.

All of the polymer blends employed in the work subsequently reported were prepared by a standard procedure. First, a master blend was prepared from (a) 70 parts of a commercially available low density film grade ethylene homopolymer having a density of about 0.924 and a melt index of about 0.8, and (b) 30 parts of a commercially available ethylene-methyl acrylate copolymer which contained 20 weight % of methyl acrylate and had a melt index of 2.4. The master blend had a tensile strength of 2,100 psi and an elongation at break of about 450%. In preparing the experimental blends, comminuted particles of the master blend and the isobutylene polymer were added to a Brabender Plasticorder operated at approximately 130° C. and 40 rpm. The mixing time was 20 minutes in all cases. Films of each blend having a range of thickness of 2-4 mils were compression molded in a press. Tensile and elongation values were measured for each film.

The films were cut into 1"×2" strips and heat sealed to different temperatures over a range from 150° F. to 250° F. To minimize errors and improve reproducibility, a set of at least three films was sealed at each temperature. The seal strength at each temperature was measured by pulling the samples to the break point in an Instrom Tester. Plots of Seal Strength (in lbs/inch) vs. Seal Temperature in °F. were made for each polymer blend and the ethylene polymer master blend contained therein. The Seal Temperature required to obtain a Seal Strength of 2.75 lbs/inch was noted for each sample.

The following examples are set forth to illustrate more clearly the principle and practice of the invention to those skilled in the art. Where parts or percentages are mentioned, they are parts or percentages on a weight basis unless otherwise noted.

EXAMPLE 1

A polymer blend was prepared from 100 parts of the ethylene homopolymer/ethylene methyl acrylate master blend previously described and 33 parts of an isobutylene homopolymer having a molecular weight of about 100,000. The blend had a tensile strength of about 1,100 psi and an elongation at break of 450%.

Following the experimental procedures previously described, the seal strength of the polymer blend and the ethylene polymer master blend were determined over a range of sealing temperature from about 150° F. to about 280° F. To obtain a seal strength of 2.75 lbs/inch, it was possible to heat seal the polymer blend of the invention at a temperature 15° F. lower than that required with the ethylene polymer master blend.

EXAMPLE 2

Example 1 was repeated except that 54 parts of the isobutylene homopolymer was employed per 100 parts of the ethylene polymer master blend. The seal temperature of the polymer blend of the invention required to obtain a seal strength of 2.75 lbs/inch was more than 30° F. lower than the seal temperature required for the ethylene polymer master blend.

In preparing plots of Seal Strength vs. Seal Temperature as previously described, it is noted that the curves for the polymer blends of the invention rise less steeply than do the curves for the ethylene polymer master blend or either of the ethylene polymers contained therein. As a consequence, effective heat seals can be obtained over a relatively wide range of sealing temperatures. This characteristic makes temperature control of the heat sealer less critical than is the case with other types of ethylene polymers.

In addition to being useful in the direct manufacture of film, the polymer blends of the invention can be used as one component in the manufacture of the multilayered coextruded film. Usually the polymer blend will be employed as a surface component to take advantage of its good heat sealing characteristics.

What is claimed:

1. A compatible blend of polymers consisting essentially of:
   (a) A low density ethylene polymer,
   (b) An ethylene copolymer, and
   (c) A solid amorphous isobutylene polymer;
said low density ethylene polymer having a density of less than about 0.945 and a melt index of about 0.5-20; said ethylene copolymer having polymerized therein about 70 to 98 weight % of ethylene and the balance an alkyl ester of acrylic or methacrylic acid; said isobutylene polymer having a molecular weight of at least about 10,000; said ethylene copolymer being present in an amount constituting about 15-50 weight % of the total weight of the low density ethylene polymer and the ethylene copolymer; and said isobutylene polymer being present in the amount of said 15-75 parts by weight for each 100 parts of combined weight of the low density ethylene polymer and the ethylene copolymer.

2. A composition of claim 1 in which the ethylene copolymer is a copolymer of ethylene and methyl acrylate and the methyl acrylate content thereof is such that it constitutes about 4-10 weight % of the combined total weight of the low density ethylene polymer and the ethylene-methyl acrylate copolymer.

3. A composition of claim 1 in which the isobutylene polymer is present in the amount of about 20-67 parts by weight for each 100 parts of combined weight of the low density ethylene polymer and the ethylene copolymer.

4. A composition of claim 1, 2, or 3 in which the isobutylene polymer has a molecular weight of about 60,000-135,000.

5. A film of a composition of claim 1.

6. A film of a composition of claim 2.

7. A film of a composition of claim 3.

8. A film of claim 5, 6 or 7 in which the isobutylene polymer contained therein has a molecular weight of about 60,000-135,000.

* * * * *